United States Patent [19]

Amada et al.

[11] Patent Number: 5,809,255
[45] Date of Patent: Sep. 15, 1998

[54] PARALLEL PROCESSING SYSTEM

[75] Inventors: Tadao Amada; Kazushige Kobayakawa; Kenji Korekata, all of Kawasaki, Japan

[73] Assignee: Fujitsu Limited, Kawasaki, Japan

[21] Appl. No.: 640,227

[22] Filed: Apr. 30, 1996

[30] Foreign Application Priority Data

Sep. 19, 1995 [JP] Japan ................................. 7-240298

[51] Int. Cl.⁶ .............................. G06F 9/38; G06F 13/38; G06F 15/00
[52] U.S. Cl. ................................ 395/200.78; 395/200.43; 395/840
[58] Field of Search ............................... 395/200.15, 475, 395/200.16, 185.4, 200.2, 184.01, 182.01, 182.07, 11, 182.09, 200.43, 200.78, 840, 800.14, 800.32, 800.1, 500; 364/DIG. 1, DIG. 2; 370/413, 388; 371/37.7, 36

[56] References Cited

U.S. PATENT DOCUMENTS 4,794,601 12/1988 Kikuchi .................................. 371/37.7
4,918,686 4/1990 Hayashi et al. ........................ 370/413
4,965,717 10/1990 Cutts, Jr. et al. ..................... 395/182.1
5,651,112 7/1997 Matsuno et al. .................... 395/184.01

FOREIGN PATENT DOCUMENTS 5-151173 6/1993 Japan .

Primary Examiner—Daniel H. Pan
Attorney, Agent, or Firm—Armstrong, Westerman, Hattori, McLeland and Naughton

[57] ABSTRACT

A parallel processing system that has a synchronous function of creating a synchronous signal in a processing element to be synchronized by shifting synchronously from a program process to the next program process and can execute such a synchronous operation in a pipeline processing mode. The parallel processing system includes a plurality of signal lines arranged between a mutual connecting unit and each of the processing elements for transmitting the status information regarding each of the processing elements from the mutual connecting unit to all of the processing elements, and the transmitting circuit sequentially transmitting contents stored in the status storage unit to the plurality of signal lines, with predetermined phase difference, and then transmitting them in parallel to each of the processing elements. This parallel processing system is applicable to a computing system in which a plurality of processing elements share one program to execute a parallel processing operation.

28 Claims, 16 Drawing Sheets

FIG.17

| | PE | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| ADDRESS 0 | 0 | 1 | 0 | 1 | 0 | 0 | 0 | 0 | 0 | 0 | 1 | 1 | 0 | 1 | 0 | 1 |
| ADDRESS 1 | | | | | | | | | | | | | | | | |
| ADDRESS 2 | | | | | | | | | | | | | | | | |
| ADDRESS 3 | | | | | | | | | | | | | | | | |

PARALLEL PROCESSING SYSTEM

BACKGROUND OF THE INVENTION

1) Field of the Invention

The present invention relates to a parallel processing process that executes in parallel one program which is shared with a plurality of processing units. More particularly, the present invention relates to a parallel processing system that has a barrier synchronous function in which a processing unit to be synchronized and to be synchronously shifted from a program process to the next program process creates synchronous signals.

2) Description of the Related Art

In current well-known parallel processing systems, a plurality of processing elements (hereinafter, referred to often as PE (Processor Element)) share one program and execute it in parallel and then handle the next program on the condition that the program process has ended.

In such a configuration, since it is impossible to predict the time when the program shared by each PE has ended, Japanese Patent Laid-open Publication (Tokkai-Hei) No. 5-151173, for example, proposes that a barrier synchronous function is arranged in the parallel processing system. A parallel processing system with the barrier synchronous function will be explained below by referring to FIG. 18.

In the parallel processing system shown in FIG. 18, a plurality of PEs 100 are connected so as to be mutually communicated by means of the mutual connecting unit 200. The mutual connecting unit 200 has the function (not shown in FIG. 18) of performing data communications between PEs 100 at the parallel processing operation in each PE 100. Moreover, a combination of the status register 201 and the status information transmitting circuit 202 realizes the function of reporting the status information of each PE 100 to each PE 100 to realize the barrier synchronous function.

The status register 201 holds the status information regarding each PE 100 and sets as status information one bit status signal transmitted from each PE 100 via the signal lines 110.

The status information transmitting circuit 202 converts the status information regarding each PE 100 held in the status register 201 into a serial form and then broadcasts the serial data to all PEs 100 via a set of broadcasting signal line 210.

For example, the status signal becomes "1" when the process allocated to each PE 100 has been completed and the status signal becomes "0" when the process allocated to each PE 100 has not been completed. Howver, the status signal may become "0" when the process allocated to each PE 100 has been completed and the status signal may become "1" when the process allocated to each PE 100 has not been completed.

On the other hand, each PE 100 is formed of the status information receiving circuit 101, the mask register 102, and the synchronous checking circuit 103 in order to realize the barrier synchronous function.

The status information receiving circuit 101 receives the status information (serial data) regarding each PE 100 transmitted from the mutual connecting unit 200 via the broadcasting signal line 210.

The mask register 102 has a bit corresponding to each PE 100 forming the parallel processing system. For example, "1" is preset to the bit corresponding to each PE 100 to be synchronized and "0" is preset as mask informtion to the bit corresponding to other PEs 100 not to be synchronized.

Moreover, the synchronous checking circuit 103 checks whether the PE 100 to be synchronized has completed an allocated process, based on the mask information held in the mask register 102 and the status information regarding each PE 100 received in the status information receiving circuit 101, and then creates a synchronous signal when the PE 100 to be synchronized has completely performed all processes. That is, the synchronous checking circuit 103 calculates the logical product (conjunction) of the bit corresponding to the mask information regarding each PE 100 held in the mask register 102 and the bit corresponding to the status information regarding each PE 100 received in the status information receiving circuit 101, and then generates a synchronous signal when all the logical products become "1".

The synchronous processing sequence of the parallel processing system with the above-mentioned configuration will be explained below.

(1) The CPU (not shown) within each PE 100 sets information regarding each PE to be synchronized to the mask register 102 at every PE 100. Each PE 100 recognizes a PE 100 to be synchronized according to the information.

(2) The CPU in each PE 100 sets the status signal (one bit signal) according to the status of a process allocated to the self PE. As described before, the status signal "1" is set when the allocation process has been completed while the status signal "0" is set when the allocation process has not been completed. The status signal is reported to the mutual connecting unit 200 via the signal line 110. Then the status register 201 sets the status signal as status information to a bit corresponding to each PE 100.

(3) The status information transmitting circuit 202 within the mutual connecting unit 200 converts the status information held in the status register 201 into a serial form at every suitable period and then broadcasts the converted information to all PEs 100 via the broadcasting signal line 210.

(4) In each PE 100, when the status information receiving circuit 101 receives the status information from the mutual connecting unit 200, the synchronous checking circuit 103 calculates the logical product of the bit corresponding to the mask information regarding each PE 100 held in the mask register 102 and the bit (PE) corresponding to the status information regarding each PE 100 received in the status information receiving circuit 101, masks the status information regarding PEs 100 other than the PE 100 to be synchronized, and then performs a synchronous checking operation, based on the resultant logical product.

(5) The synchronous checking circuit 103 executes a synchronous checking operation by judging whether the resultant logical product, or the status information of each of all PEs 100 to be synchronized, is "1" (or "0"). Then when the status information regarding all PEs 100 to be synchronized are "1", the synchronous checking circuit 103 judges that all the PEs 100 to be synchronized have completed the allocated processes and then generates a barrier synchronous signal to output to the CPU and others. Thus the PEs 100 to be synchronized can be synchronously shifted to the following program process.

Of a plurality of PEs 100 shown in FIG. 18, when four PEs 01 to 04, for example, are to be synchronized according to the above-mentioned operation, the synchronous process is performed as shown in FIG. 19.

That is, the PEs 01 to 04 share the program A and then execute them in parallel as the processes A1 to A4, respectively. Then the status is halted till all the PEs 01 to 04 finish the processes A1 to A4 in the program A. When all the processes A1 to A4 have been completed (or the PE02 has completed the process A2 shown in FIG. 19), a barrier synchronous signal is produced. Thereafter, the process is shifted to the next program B in which the end of the program A is needed as the execution condition.

As in the above-mentioned operation, the four PEs 01 to 04 process in parallel the program B. When the PEs 01 to 04 complete the processes A1 to A4, the barrier synchronous signal is produced. Then the flow goes to the next program C. This program C is handled in the same way.

The above-mentioned general parallel processing system which includes a set of broadcasting signal lines 210 to transmit the status information from the mutual connecting unit 200 to each PE 100 broadcasts the status information in a serial form via the broadcasting signal lines 210. However, increasing the number of PEs 100 forming the system results in an increased amount of status information, so that the prolonged transmission time decreases the synchronous process efficiency.

For the countermeasures, an increase in the number of the signal lines which transmit the status information may be considered. However, merely increasing the number of signal lines leads to an increase in the hardware amount in each PE 100 and a prolonged synchronous processing time because the synchronous checking circuit 103 or the logical OR circuit must be arranged for each signal line (e.g. refer to FIG. 4 to be shown later).

In the parallel processing system, the number of PEs depends generally on the model configuration. However, there is a disadvantage in that when the above-mentioned barrier synchronous processing portion is formed suitable for the model configuration for the largest number of PEs, the synchronous processing efficiency in a parallel processing operation which is executed with a small number of PEs becomes very poor.

SUMMARY OF THE INVENTION

The present invention overcomes the above mentioned problems. An object of the present invention is to provide a parallel processing system which can execute a synchronous process in a pipeline processing mode, thus realizing a high-speed synchronous process, with decrease in hardware amount depressed required.

In order to achieve the above object, according to the present invention, the parallel processing system includes a plurality of plural processing elements; at least one mutual connecting unit for mutually connecting the plurality of processing elements to a communicable state; the mutual connecting unit including a status storage unit for storing status information regarding each of the processing elements and a transmitting circuit for transmitting status information regarding each of the processing elements stored in the status storage unit to the plurality of processing elements; each of the processing elements executing a processing operation according to the status information regarding each of the processing elements transmitted from the mutual connecting unit while being synchronized with the operations of the other processing elements; plurality of signal lines arranged between the mutual connecting unit and each of the processing elements, for transmitting the status information regarding each of the processing elements from the mutual connecting unit to the plurality of processing elements; and the transmitting circuit sequentially transmitting the contents in the status storage unit to the plurality of signal lines, with predetermined phase difference, and then transmitting them in parallel to each of the processing elements.

As described above, in the parallel processing system according to the present invention, the transmitting circuit transmits in parallel the contents stored in the status storage unit to each of the processing elements via a plurality of signal lines, with a predetermined phase difference. Hence, each processing element can execute a synchronous process in a pipeline process mode as well as the synchronous process using the latest status information, whereby a high-speed synchronous process can be effectively performed, without an increase in the amount of hardware.

BRIEF DESCRIPTION OF THE DRAWINGS

FIG. 17 is a diagram used for explaining the configuration of a mask register in a modified example of the processing element shown in FIG. 16;

DESCRIPTION OF THE PREFERRED EXEMPLARY EMBODIMENT

Figure 1:
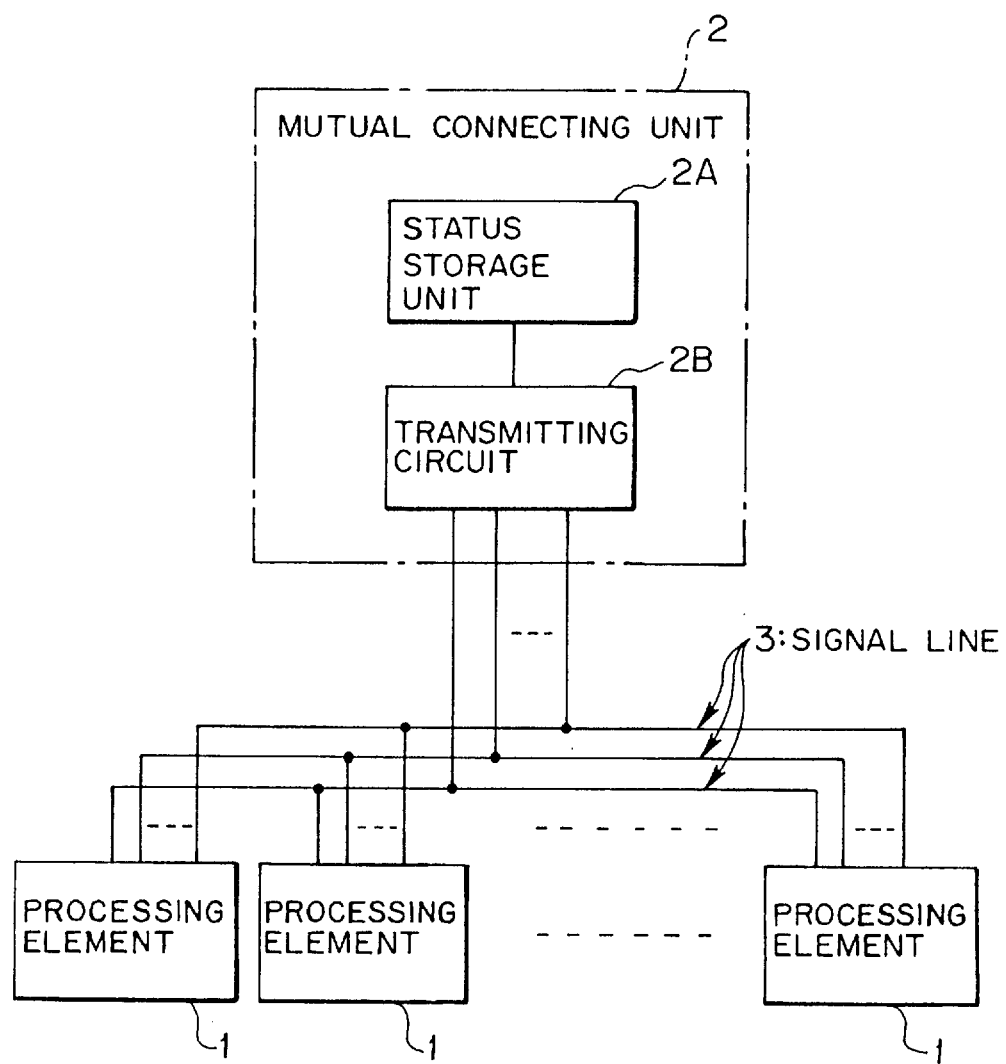
FIG. 1 is a block diagram of the present invention.

FIG. 1 is a block diagram showing the present invention. Referring to FIG. 1, numeral 1 represents a plurality of processing elements, 2 represents at least one mutual connecting unit for mutually connecting plural processing elements 1 in a communicable state. The processing elements 1 and the mutual connecting unit 2 provide the parallel processing system according to the present invention.

The mutual connecting unit 2 includes a status storage unit 2A for holding status information regarding each processing element 1 and a transmitting circuit 2B for transmitting status information regarding each processing element 1 held in the status storage unit 2A to all the processing elements 1. Each processing element 1 executes its processing operation according to the status information regarding each processing element 1 transmitted from the mutual connecting unit 2, in synchronous with the operation of other processing elements 1.

In the parallel processing system according to the present invention, a plurality of signal lines 3 which transmit the status information regarding each of the processing elements 1 from the mutual connecting unit 2 to all the processing elements 1 are arranged between the mutual connecting unit 2 and each processing element 1. The transmitting circuit 2B transmits sequentially and in parallel the contents stored in the status storage unit 2A to each processing element 1 via the plurality of signal lines 3, with a predetermined phase difference.

The parallel processing system may further include a phase difference setting mechanism for setting the predetermined phase difference and transfer-length setting mechanism for setting the transfer-length of data transmitted from the status storage unit 2A to the plurality of signal lines 3 by means of the transmitting circuit 2B.

The parallel processing system may further include a signal line number setting mechanism for setting the number of signal lines 3 used for data transmission among a plurality of signal lines 3 according to the number of processing elements 1. The parallel processing system may further include a phase difference setting mechanism for setting the predetermined phase difference according to the number of signal lines in use set by the signal line number setting mechanism. The phase difference setting mechanism sets the predetermined phase difference to a multiple of (the transfer-length set by the transfer-length setting mechanism)/(the number of signal lines in use set by the signal line number setting mechanism).

Moreover, the status information regarding each of the processing elements 1 transmitted by the transmitting circuit 2B via each signal line 3 may be divided into a plurality of blocks and each of the processing elements 1 may execute processing at every block. In this case, unit length setting mechanism may be arranged to set the split-unit length of each of the blocks.

In the parallel processing system, each of the processing elements 1 may include a mask information storage unit for holding previously information as a mask information regarding another processing element to be synchronized with a self processing element, and a mask processing unit for masking the status information regarding other processing element not to be synchronized among a plurality of pieces of status information regarding each of the processing elements 1 received via the plurality of signal lines 3, based on the mask information held in the mask information storage unit.

Likewise, in the parallel processing system, each of the processing elements 1 may include a mask information storage unit and a mask processing unit. In this case, the mask information storage unit may include a storage element which can read partially the mask information; and the mask processing unit may execute a mask processing operation by partially reading the mask information corresponding to each block at every block out of the mask information storage unit.

Moreover, in the parallel processing system, each of the processing elements 1 may include a plurality of receiving storage units for holding temporarily each of the plurality of pieces of status information transmitted via the plurality of signal lines 3, and a selecting circuit for selecting suitably one of the plurality of receiving storage units and then outputting the status information held by the selected receiving storage unit to the mask processing unit.

As described above, in the parallel processing system according to the present invention, since the transmitting circuit 2B transmits in parallel the contents held in the status storage units 2A to each processing elements 1 via the plurality of signal lines 3, with a predetermined phase difference, each processing element 1 can execute a synchronous process as a pipeline process mode and a synchronous process using the latest status information. Hence, a high-speed synchronous process can be effectively performed while an increase in hardware amount is suppressed.

Various setting conditions for a status information transfer can be changed using the phase difference setting mechanism, transfer-length setting mechanism, the signal number setting mechanism, and the unit-length setting mechanism. Hence, the model configuration can easily deal with a variation in the number of processing elements 1 so that a scalable synchronous process can be effectively realized.

The status information regarding processing elements 1 other than the processing element 1 to be synchronized can be masked using the mask information storage unit and the mask processing unit in each processing element 1. Hence, the synchronous process can be performed using the status information regarding the processing element 1 to be synchronized.

Moreover, each processing element 1 includes a receiving storage unit for each of the plurality of signal lines 3, and the selecting circuit selects suitably the status information regarding each receiving storage unit and then outputs it to the mask processing unit. As a result, even if the number of signal lines 3 arranged between each processing element 1 and the mutual connecting unit 2 increases, the increase can be dealt with by merely adding the receiving storage units by the increased amount of signal lines 3. Hence, the number of hardware in each processing element 1 is not increased and the synchronous process is not prolonged.

A preferred exemplary embodiment according to the present invention will be explained below by referring to the attached drawings.

Figure 2:
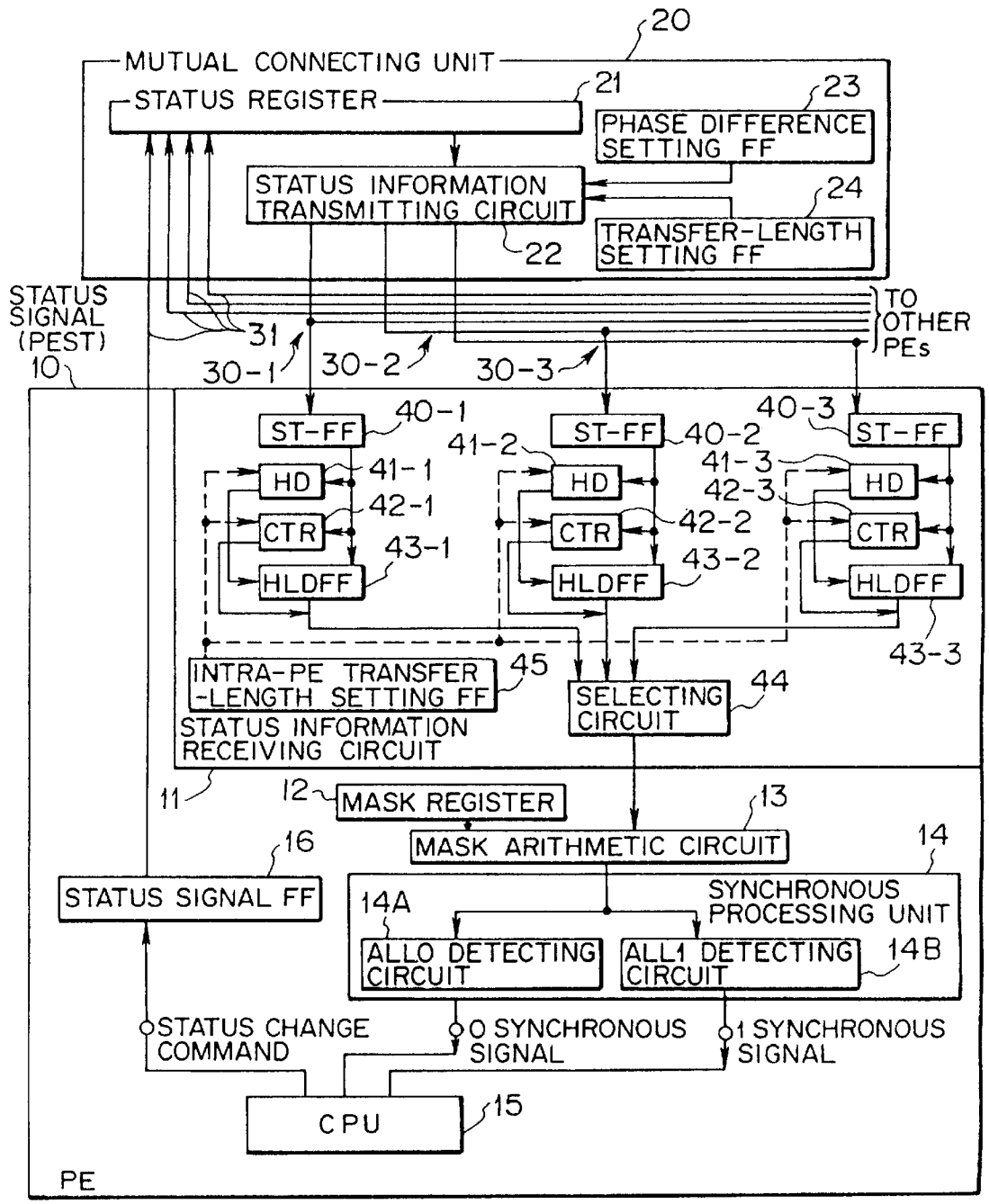
FIG. 2 is a block diagram showing a parallel processing system according to a preferred exemplary embodiment of the present invention.

FIG. 2 is a block diagram illustrating the parallel processing system in a preferred exemplary embodiment according to the present invention. As shown in FIG. 2, the parallel processing system according to the present embodiment is formed by connecting four PEs (processor elements, processing units) 10 in a mutually communicable state using a sole mutual connecting unit 20. FIG. 2 illustrates only one PE 10, but the other three PEs 10 are omitted. The other PEs 10 are formed in the same way as that shown in FIG. 2.

The mutual connecting unit 20 has a function (not shown in FIG. 2) of performing data communications between PEs 10 when each PE 10 executes a parallel process. Moreover, in order to realize the barrier synchronous function, the status register 21 and the status information transmitting circuit 22 realize the function of reporting the status information (information on a process progress status) regarding each PE 10 to each PE 10.

In the status register 21, which holds status information regarding each PE 10, a one-bit status signal transmitted from each PE 10 via one-bit signal line 31 is set as status information to the bit corresponding to each PE 10. The configuration of the status register 21 will be described in detail later with reference to FIG. 5. As described before, for example, the status signal in each PE 10 becomes "1" when the process allocated to each PE 10 has been completed and "0" when the process allocated to each PE 10 has not been completed, and vice versa.

Figure 5:
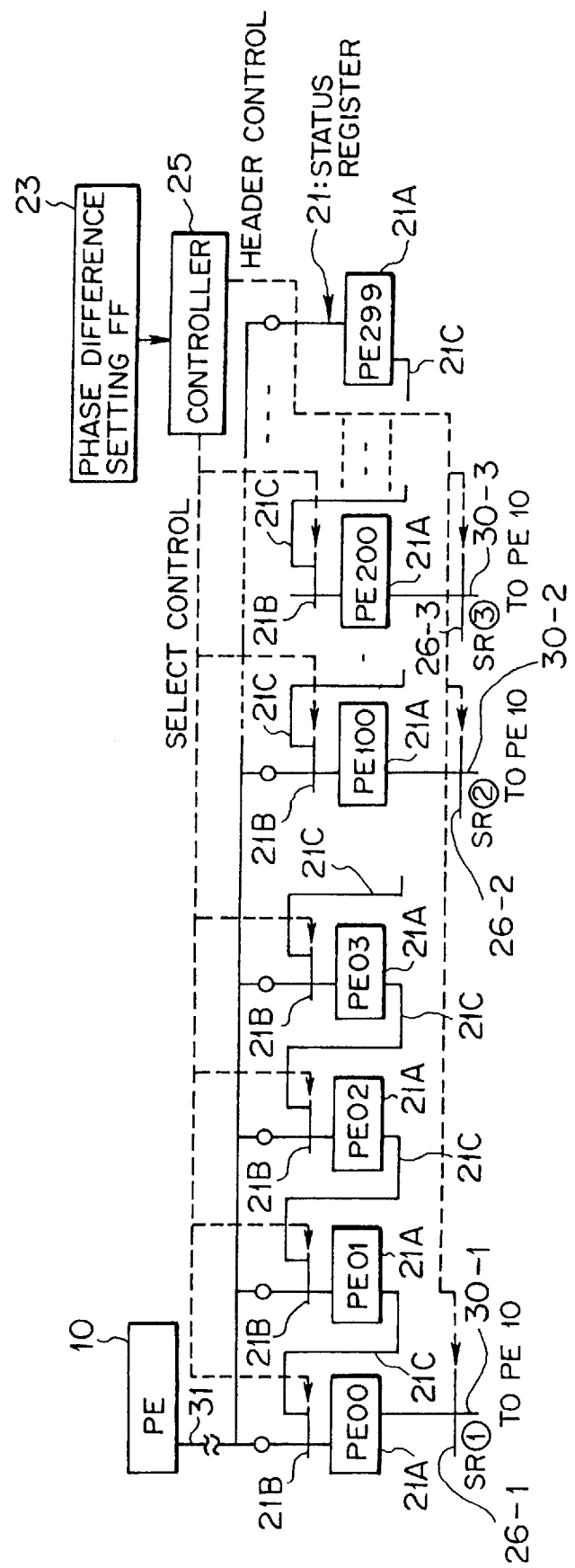
FIG. 5 is a block diagram showing in detail the status register and transmitting circuit in the mutual connecting unit according to the preferred exemplary embodiment.

The status information transmitting circuit 22 converts the status information regarding each PE 10 held in the status register 21 into a serial form and then broadcasts the serial data to all the PEs 10. For example, as shown in FIG. 5, the status information transmitting circuit 22 consists of a controller 25, a selector 21B, a shift signal line 21C, and an output switches (status information transmitting circuits) 26-1, 26-2 and 26-3.

In the preferred exemplary embodiment, three sets of broadcasting signal lines 30-1, 30-2 and 30-3 (less than four sets of PEs 10) are arranged between the mutual connecting unit 20 and each PE 10 to transmit the status information regarding each PE 10 from the mutual connecting unit 20 to all the PEs 10. The status information transmitting circuit 22 transmits sequentially and in parallel the contents stored in the status register 21 to each PE 10 via three sets of broadcasting signal lines 30-1, 30-2 and 30-3, with a predetermined phase difference.

Moreover, the mutual connecting unit 20 includes a phase difference setting flip-flop (phase difference setting mechanism) 23 and a transfer-length setting flip-flop (transfer-length setting mechanism) 24. These flip-flops 23 and 24 may be arranged in each PE 10 or in both each PE 10 and the mutual connecting unit 20. (The flip-flop is sometimes abbreviated hereinafter as FF).

The phase difference setting flip-flop 23 sets the predetermined phase difference value as the timing when the contents stored in the status register 21 are sequentially transmitted to three sets of broadcasting signal lines 30-1, 30-2 and 30-3. The controller 25 (to be described later) performs a transmission control according to the phase difference by varying the value set by the phase difference setting FF23 using a certain mechanism such as an external command.

The transfer-length setting flip-flop 24 sets the transfer-length value of data transmitted from the status register 21 to the broadcasting signal lines 30-1, 30-2 and 30-3 by means of the status information transmitting circuit 22. The controller 25 controls the data transmission according to the set length by varying the value set by the transfer-length setting FF24 using a certain mechanism such as an external command.

On the other hand, according to the present embodiment, each PE 10 receives the status information sequentially transmitted from the mutual connecting unit 20 via the three sets of broadcasting signal lines 30-1, 30-2 and 30-3 with a predetermined phase difference and then performs a barrier synchronous process in the manner of a pipeline process, based on the status information while it is synchronized with the operations of other PEs 10. Each PE 10 consists of a status information receiving circuit 11, a mask register 12, a mask arithmetic circuit 13, a synchronous processing unit 14, a CPU 15, and a status signal flip-flop 16.

The status information receiving circuit 11 receives status information (serial data) regarding each PE 10 transmitted from the mutual connecting unit 20 via the broadcasting signal lines 30-1 to 30-3.

Corresponding to each of the broadcasting signal lines 30-1, 30-2 and 30-3, the status information receiving circuit 11 includes status signal receiving flip-flops 40-1, 40-2 and 40-3, header detecting circuits 41-1, 41-2 and 41-3, counters 42-1, 42-2 and 42-3, status signal holding flip-flops 43-1, 43-2 and 43-3, a selecting circuit 44, and an intra-PE transfer-length setting flip-flop (unit-length setting mechanism) 45.

Each of the status signal receiving FFs (ST-FFs, receiving storage units) 40-1, 40-2 and 40-3 holds sequentially bit-by-bit the status information regarding each PE 10 transmitted in a serial state from the broadcasting signal lines 30-1 to 30-3.

Each of the header detecting circuits (HD) 41-1, 41-2 and 41-3 detects the leading header of transfer data (refer to FIGS. 6 to 12 and 14; e.g. a chain of 10 bits having "1") by referring to data held in each of the status signal receiving FFs 40-1, 40-2 and 40-3.

The counter (CTR) 42-1 counts the number of data (bit count) transmitted from the status signal receiving FF 40-1 to the status signal holding FF 43-1. The counter (CTR) 42-2 counts the number of data (bit count) transmitted from the status signal receiving FF 40-2 to the status signal holding FF 43-2. The counter (CTR) 42-3 counts the number of data (bit count) transmitted from the status signal receiving FF 40-3 to the status signal holding FF 43-3. The counter 42-1 is activated when the header detecting circuit 41-1 detects a header.

Then when the count value reaches a value set by the intra-PE transfer-length setting FF 45, the counter 42-1 outputs a reception completion signal and transfers the status information held in the status signal holding FF 43-1 to the selecting circuit 44 arranged at the rear stage. The counter 42-2 is activated when the header detecting circuit 41-2 detects a header.

Then when the count value reaches a value set by the intra-PE transfer-length setting FF 45, the counter 42-2 outputs a reception completion signal and transfers the status information held in the status signal holding FF 43-2 to the selecting circuit 44 arranged at the rear stage. The counter 42-3 is activated when the header detecting circuit 41-3 detects a header. Then when the count value reaches a value set by the intra-PE transfer-length setting FF 45, the counter 42-3 outputs a reception completion signal and transfers the status information held in the status signal holding FF 43-3 to the selecting circuit 44 arranged at the rear stage.

That is, the status information regarding each PE 10 transmitted in a serial form via each of the broadcasting signal lines 30-1, 30-2 or 30-3 is divided into blocks corresponding to the number of bits set in the intra-PE transfer-length setting FF 45. The status information corresponding to the bit number (split-unit length) is stored in the status signal holding FF 43-1, 43-2 or 43-3. The split-unit length of, for example, 1 byte, 2 byte, 3 byte, . . . , is set to the intra-PE transfer length setting FF 45. The split-unit length is set in the form of, for example, 1 byte, 2 byte, 3 byte, . . . , to the intra-PE transfer-length setting FF 45. The blocking operation is performed according to the split-unit length by externally varying the value of the intra-PE transfer-length setting FF 45 using a certain mechanism such as a command. FIGS. 13(*b*) and 14 show an example of status information of each PE 10 divided into blocks every one byte.

Figure 11:
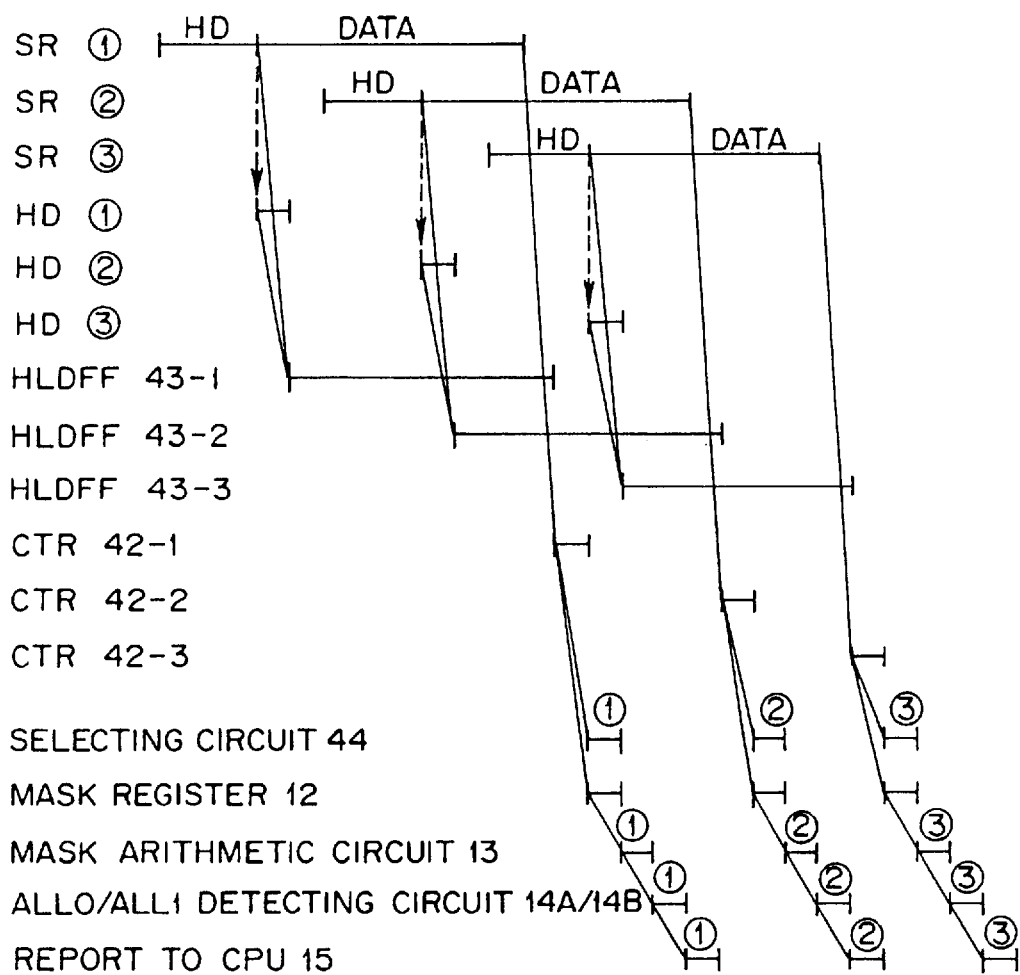
Figure 12:
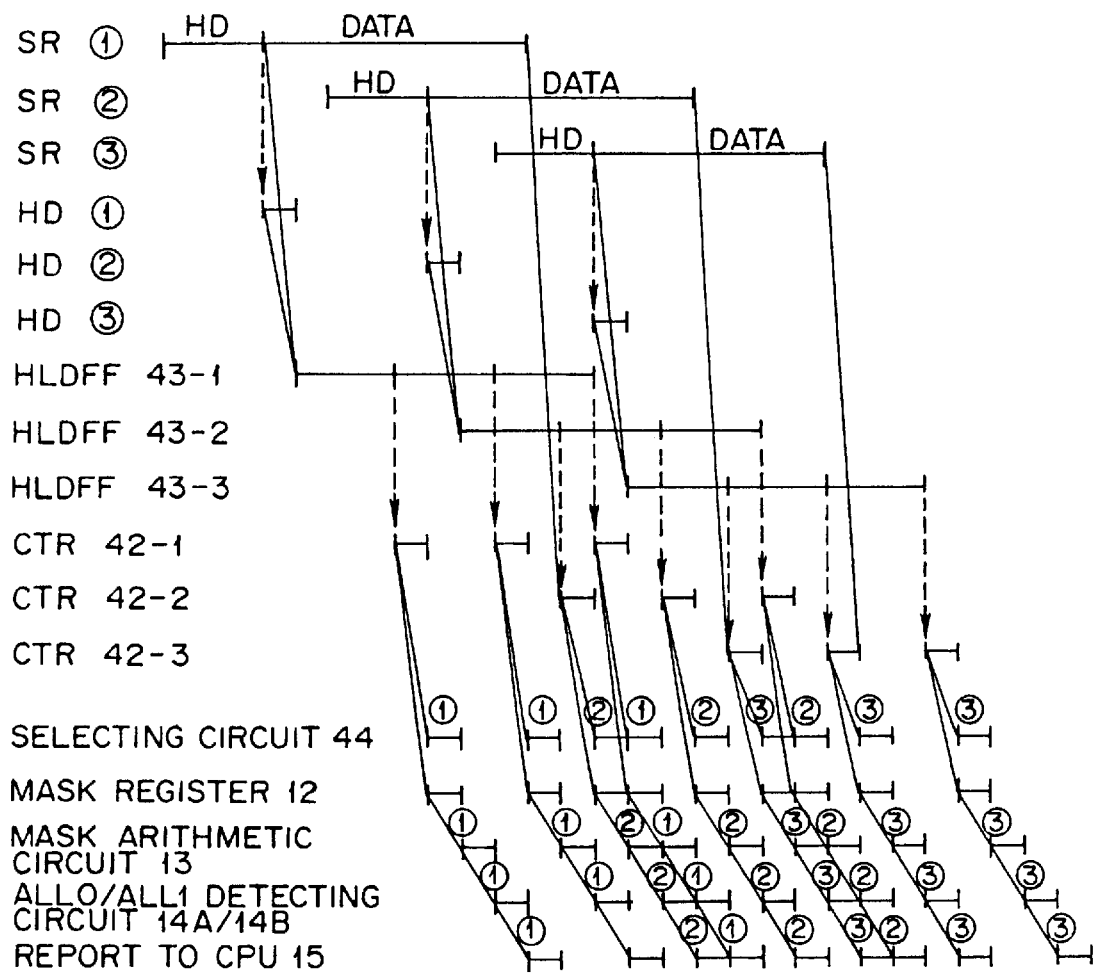

Since three pieces of status information from the three system is divided into blocks, each PE 10, as shown in FIGS. 11 and 12, can subject the status information to the synchronous process in a pipeline process mode every split-unit length.

The status signal holding FF (HLDFF, receiving storage unit) 43-1 stores sequentially and temporarily as status information of a plurality of bits (e.g. 1 byte) or split-unit length the status information regarding each PE 10 transmitted serially via the broadcasting signal line 30-1 and then outputs it in a parallel form. The status signal holding FF (HLDFF, receiving storage unit) 43-2 stores sequentially and temporarily as status information of a plurality of bits (e.g. 1 byte) or split-unit length the status information regarding each PE 10 transmitted serially via the broadcasting signal line 30-2 and then outputs it in a parallel form. The status signal holding FF (HLDFF, receiving storage unit) 43-3 stores sequentially and temporarily as status information of a plurality of bits (e.g. 1 byte) or split-unit length the status information regarding each PE 10 transmitted serially via the broadcasting signal line 30-3 and then outputs it in a parallel form.

The selecting circuit 44 selects one of the status signal holding FFs 43-1, 43-2 and 43-3 and then outputs the status information in a plurality of bits held in the selected one to the mask arithmetic circuit 13 at the rear stage.

The mask register (mask information storage unit) 12 has bits corresponding to each PE 10 forming the parallel processing system. For example, the bit corresponding to the PE 10 to be synchronized is preset to "1" while the bit corresponding to the PE 10 not to be synchronized is preset to "0" as mask information.

The mask arithmetic circuit (mask processing unit) 13 masks the status information regarding the other PE 10 not to be synchronized among a plurality of pieces of status information regarding PEs 10 received by the status information receiving circuit 11, based on the mask information held in the mask register 12. In particular, the mask arithmetic circuit 13 multiplies logically the bit corresponding to mask information regarding each PE 10 held in the mask register 12 by the bit corresponding to the status information regarding each PE 10 received in the status information receiving circuit 11 and then outputs the logical product (conjunction).

The synchronous processing unit 14 checks whether the PE 10 to be synchronized has completed an allocated process. If the PE 10 to be synchronized has completed the process, the synchronous processing unit 14 creates a synchronous signal. The synchronous processing unit 14 consists of an ALL0 detecting circuit 14A which outputs a "0" synchronous signal when it detects that all outputs from the mask arithmetic circuit 13 becomes "0" and an ALL1 detecting circuit 14B which outputs a "1" synchronous signal when it detects that all outputs from the mask arithmetic circuit 13 becomes "1".

When the status signal regarding each PE 10 is "1" at a process completion time, the output of the ALL1 detecting circuit 14B is used as a synchronous signal. When the status signal regarding each PE 10 is "0" at a process completion time, the output of the ALL0 detecting circuit 14A is used as a synchronous signal. In the present embodiment, the status signal regarding each PE 10 is "1" at a process completion time and the output of the ALL1 detecting circuit 14B is used as a synchronous signal.

The CPU 15 performs actually the process of each PE 10. The CPU 15 executes a process, in synchronous with the operation of other PE 10, while it receives the synchronous signal from the synchronous processing unit 14. When the process allocated to self PE 10 is completed, the CPU 15 also sets the 1-bit status signal ("1" at the completion time) representing the process completion to the status signal flip-flop 16. The status signal set to the status signal FF 16 is reported to the mutual connecting unit 20 and then stored to the bit corresponding to the self PE 10 of the status register 21.

Figure 3:
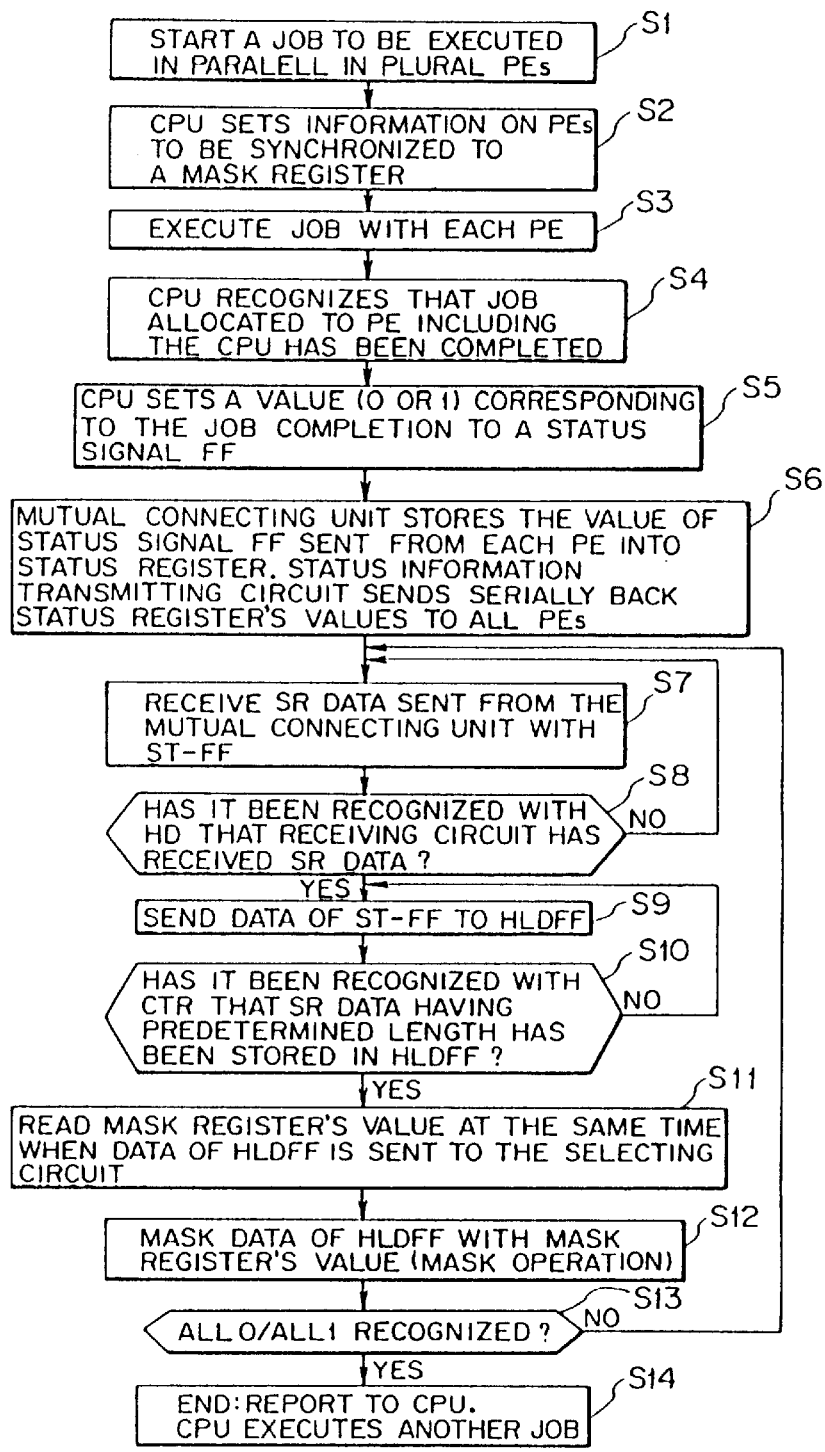
FIG. 3 is a flowchart used for explaining the operation of the preferred exemplary embodiment of the present invention.

The basic operation of the parallel processing system having the above-mentioned configuration according to the present embodiment will be explained below with the flowchart (steps S1 to S14) shown in FIG. 3. First, when the plurality of PEs 10 start processing a job to be executed in parallel (step S1), the CPU 15 in each PE 10 sets the information regarding the PE 10 to be synchronized to the mask register 12 (step S2). Then the CPU 15 executes the job allocated to its PE 10 (step S3). When it is recognized that the allocated job has been completed (step S4), the CPU 15 sets as a status signal the value "1" corresponding to the job completion to the status signal FF16 by outputting the status change command (step S5).

The mutual connecting unit 20 stores the value of the status signal FF16 transmitted from each PE 10 in the status register 21 and then broadcasts the value (status information) of the status register 21 to all the PEs 10 via the broadcasting signal lines 30-1 to 30-3 (step S6) by means of the status information transmitting circuit 22. The method of broadcasting the value in the status register 21 will be described later by referring to FIGS. 5 to 14.

In each PE 10, the status information receiving FF 40-1 receives the status information (hereinafter, expressed often as SR (State Register) data) transmitted from the mutual connecting unit 20 via the broadcasting signal line 30-1 (step S7). The status information receiving FF 40-2 receives the status information transmitted from the mutual connecting unit 20 via the broadcasting signal line 30-2 (step S7). The status information receiving FF 40-3 receives the status information transmitted from the mutual connecting unit 20 via the broadcasting signal line 30-3 (step S7). In each PE 10, it is recognized whether each of the header detecting circuits 41-1, 41-2 and 41-3 has received the SR data or header (step S8).

When it is recognized that the SR data has not been received, the flow goes back to the step S7. When it is recognized that the SR data has been received, each of the counters 42-1 to 42-3 counts the number of bits while the SR data stored in each of the status signal receiving FFs 40-1 to 40-3 is transferred bit by bit to the status signal holding FFs 43-1 to 43-3 till the count value reaches the value set by the intra-PE transfer-length setting FF 45 (steps S9 and S10).

When the SR data of a predetermined number of bits (split-unit length) is stored in each of the status signal holding FFs 43-1 to 43-3 (or the decision in the step S10 is YES), each SR data is transferred to the selecting circuit 44 while the mask information regarding the PE 10 corresponding to the SR data is read out of the mask register 12 (step S11).

Then when the mask arithmetic circuit 13 calculates the logical product of the SR data selectively output from the selecting circuit 44 and the mask information from the mask register 12, the SR data regarding a PE 10 not to be synchronized is masked (step S12). Then, in the preferred exemplary embodiment, the ALL 1 detecting circuit 14B in the synchronous processing unit 14 recognizes whether all bits of the SR data from the mask arithmetic circuit 13 are "1", that is, whether all the PEs 10 to be synchronized have completed the process currently in operation (step S13).

If all bits of the SR data are not "1", the flow goes back to the step S7. The same process is repeated and the flow is in a wait state till all the bits of the SR data become "1".

If all bits of the SR data are "1", the fact is reported as a "1" synchronous signal to the CPU 15. Then the CPU 15 executes another job (step S14).

Next, the configuration and operation (including function, effect, and the like) of the parallel processing system according to the preferred exemplary embodiment will be explained in further detail with reference to FIGS. 4 to 14.

The parallel processing system according to the preferred exemplary embodiment includes a plurality of sets (in this case, three sets) of broadcasting signal lines 30-1 to 30-3 which transmit status information from the mutual connecting unit 20 to each PE 10. As described later, each PE 10 can realize the synchronous process in a pipeline process mode every broadcasting signal lines 30-1 to 30-3 by transmitting a plurality of pieces of status information to the broadcasting signal lines 30-1 to 30-3, with a phase difference between each one.

Figure 4:
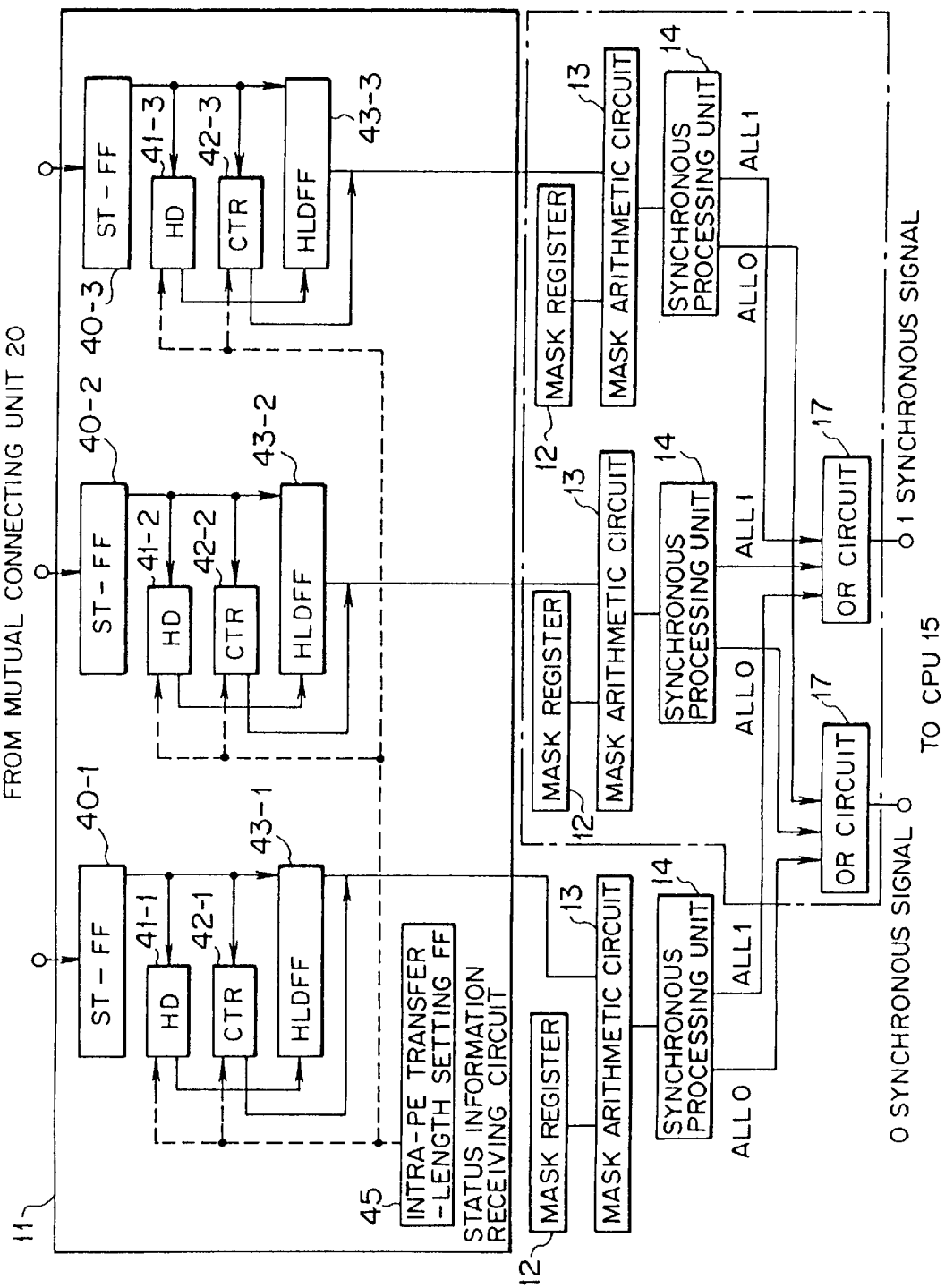
FIG. 4 is a block diagram showing the configuration of a processing element (PE) which does not execute in a pipeline process mode, to explain the function and effect of the embodiment.

FIG. 4 illustrates the PE configuration which does not execute a pipeline process. FIG. 4 shows an example where the number of signal lines each which transmits status information is merely increased to three, instead of one. As is obvious from a comparison with the embodiment shown in FIG. 2, the PE configuration shown in FIG. 4 requires the elements surrounded with chain lines, instead of the selecting circuit 44 shown in FIG. 2.

That is, two OR circuits 17 which calculate the logical product of synchronous signals from three synchronous processing units 14 are needed for each signal line, together with mask register 12, the mask arithmetic circuit 13 and the synchronous processing unit 14.

In the preferred exemplary embodiment, attention is paid to the process speed in each PE 10 faster than the transfer speed from the mutual connecting unit 20. The hardware within the area surrounded with chain lines shown in FIG. 4 is reduced by executing the synchronous process in each PE 10 in a pipeline process mode while the high-speed synchronous processing can be realized.

As described before, the mutual connecting unit 20 according to the preferred exemplary embodiment converts the status information regarding each PE 10 held in the status register 21 into a serial form and then broadcasts the serial data to all the PEs 10 via the three broadcasting signal lines 30-1, 30-2 and 30-3, with a predetermined phase difference decided corresponding to the value set by the phase difference setting FF 23.

The configuration including the status register 21 and the status information transmitting circuit 22 which enables the above-mentioned data transmission will be in further detail explained by referring to FIG. 5. It is assumed that the following example includes 300 PEs 10 (expressed to as PE numbers 00 to 299) in the maximum configuration. The status register 21 shown in FIG. 5 can hold 300 status signals regarding 300 PEs 10 to the 300 one-bit registers 21A, respectively. As described above, the plurality of pieces of status information held in the status register 21 are broadcast to all the PEs 10 via the three sets of broadcasting signal lines 30-1- to 30-3.

In each one-bit register 21A, either the status signal of the corresponding PE 10 or the status signal regarding an adjacent one-bit register 21A (the PE status signal having a PE number incremented by one) is set via the selector 21B. In other words, both the signal line 31 extending from each PE 10 and the shifting signal line 21C acting as an output line of the adjacent one-bit register 21A are connected to the input of each one-bit register 21A via the selector 21B. The selector 21B is controllably switched by means of the controller 25.

In the present embodiment, in order to respectively output the status information regarding 300 PEs 10 to the three sets of broadcasting signal lines 30-1 to 30-3, with a phase difference determined by the phase difference setting FF 23, the output line of the one-bit register 21A holding the status signals regarding the PE 10 with PE number 00 is connected to the broadcasting signal line 30-1 via the outputting switch 26-1; the output line of the one-bit register 21A holding the status signals regarding the PE 10 with PE number 100 is connected to the broadcasting signal line 30-2 via the outputting switch 26-2; and the output line of the one-bit register 21A holding the status signal regarding the PE 10 with PE number 200 is connected to the broadcasting signal line 30-3 via the outputting switch 26-3. The controller 25 on/off controls (header-controls) respectively the output switches 26-1, 26-2 and 26-3 to output as SR①, SR② and SR③ the plurality of pieces of data (status information) held in the status register 21 following a predetermined header (HD).

In the status register 21 shown in FIG. 5, the controller 25 controls the status of each selector 21B and the status of each of the output switches 26-1 to 26-3 to capture the status signal regarding each PE10 into each one-bit rgister 21A, or, to broadcast the value in the status register 21 as the SR①, SR② and SR③ in a serial state to three sets of broadcasting signal lines 30-1 to 30-3 by sequentially shifting each value in the status register 21 to the adjacent one-bit register 21A.

The controller 25 can be formed simply of counters. That is, the controller 25 includes a counter (not shown) which controls a transmission of the status information SR①, SR② or SR③. For example, when the setting value of the phase difference setting FF 23 is "0", the transmission is performed without any phase difference. When the setting value of the phase difference setting FF23 is "10", the transmission is performed with a phase difference of 10.

Figure 6:
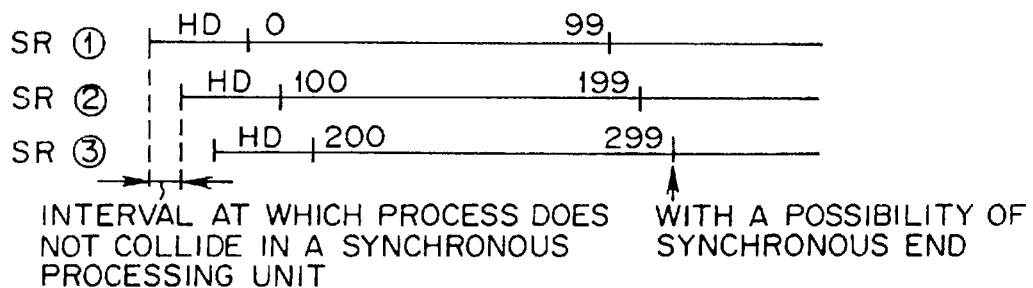
FIG. 6 to FIG. 12 are timing charts used for explaining the operation of the preferred exemplary embodiment.
Figure 7:
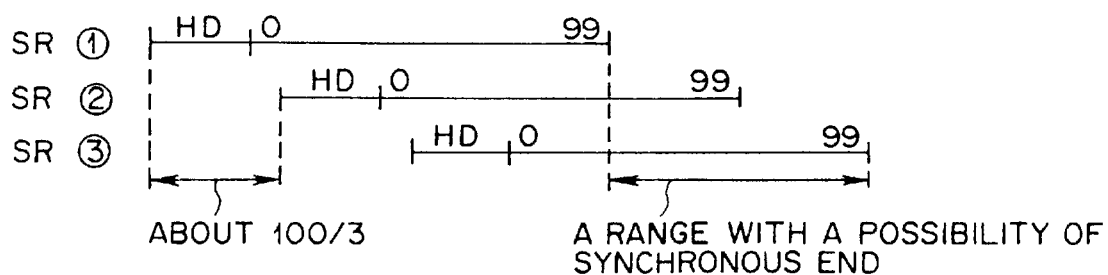

In concrete, the status information SR① is transmitted to the broadcasting signal line 30-1 at the timing shown in FIG. 6. The status information SR② is transmitted to the broadcasting signal line 30-2 at the timing shown in FIG. 6. The status information SR③ is transmitted to the broadcasting signal line 30-3 at the timing shown in FIG. 6. The phase difference is set in such a manner that the processes in the synchronous processing unit 14 does not collide or interfere with each other (or that at least two status information holding FFs 43-1 to 43-3 do not output simultaneously data to the selecting circuit 44).

Where the parallel processing system according to the preferred exemplary embodiment consists of 100 PEs 10, it is desirable to set the phase difference as shown in FIG. 7 to improve efficiency. That is, the transmission phase difference between the status information SR①, SR② and SR③ is set to about 100/3 (the time taken to transfer data of about 100/3 bits). In this case, a plurality of status signals regarding the PEs 10 with the PE number 00 to 99 are stored in an overlapped mode in the registers 21A with PE number 100 or more in the status register 21, or a plurality of pieces of information in the registers 21A with the PE number 100 or more are neglected as dummy transfer information. In the following explanation, it is assumed that a plurality of status signals regarding the PE 10 with PE number 00 to the PE 10 with PE number 99 are stored in an overlapped mode.

As described above, according to the preferred exemplary embodiment, the very important function and effect in the parallel processing system is that the transmission phase difference between the status information SR① to the broadcasting signal line 30-1, the status information SR② to the broadcasting signal line 30-2 and the status information SR③ to the broadcasting signal line 30-3 can be varied according to a change in the number of PEs.

In the preferred exemplary embodiment, the parallel processing system can have a signal line number setting function to set the number of signal lines which transmits the status information from the mutual connecting unit 20 to each PE 10 according to the number of PEs 10. This function is realized by arranging, for example, a signal line number setting flip-flop (not shown) in the mutual connecting unit 20 or each PE 10. The set value of the signal line number setting FF is varied with a certain means such as an external command. Thus, the data transmission can be controlled using signal lines corresponding to the number of signal lines.

Figure 8:
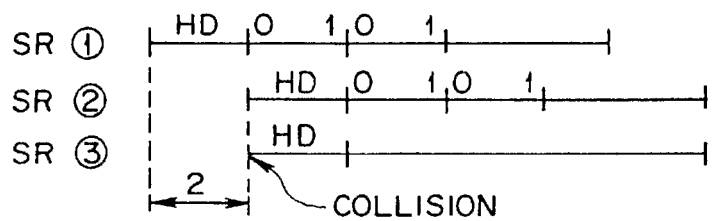

For example, with two PEs 10 in the above-mentioned parallel processing system, it is considered that only two broadcasting signal lines are needed. As shown in FIG. 8, when the status information regarding two PEs 10 are transmitted, the status information SR② collides with the status information SR③. In this case, widening the data transmission interval to avoid a collision during the process in the synchronous processing unit 14 results in a poor processing efficiency.

In such a case, if two signal lines are selected for a data transmission using the signal line number setting function, the status information is transferred, for example, via two broadcasting signal lines 30-1 and 30-2. As a result, the processing operation can be performed efficiently without causing data collision.

With two PEs 10 used, the status signals regarding PEs 10 with the PE numbers 00 and 01 are stored in an overlapped mode into the registers 21A with the PE number 02 or more in the status register 21, or the information in each of the registers 21A with the PE number 02 or more is neglected as a dummy transfer information. It is assumed that the transfer phase difference between the status information SR① and SR② is 2 (the time taken to transfer data by 2 bits).

Figure 9:
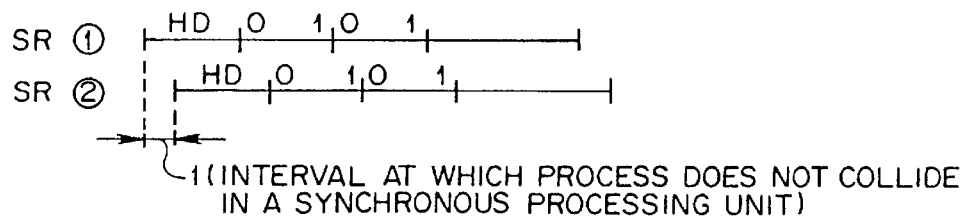

In this case, the synchronous process in each PE 10 can be effectively performed in a pipeline process mode by preparing the phase difference setting function which sets the transfer phase difference between plural pieces of status information according to the number of signal lines in use which is set with the signal line number setting function. For example, in the case shown in FIG. 8, the data SR① and SR② appear at the same time after the second transfer operation. However, as shown in FIG. 9, the status information transfer can be effectively realized because the status information SR① and the status information SR② are shifted in phase because the phase difference setting function sets the phase difference at 1 (the time taken to transfer 1-bit data, but corresponding to an interval during which a collision does not occur during a process in the synchronous processing unit 14).

In this case, by utilizing the phase difference setting function, the phase difference is set to a multiple of [the transfer length set according to the transfer-length setting function (a value set by the transfer-length setting FF24)]/ [the number of signal lines in use set according to the signal line number setting function].

For example, provided that two pieces of status information are transmitted to each PE 10 via the signal lines m and (m+1) with a predetermined phase difference from the mutual connecting unit 20, a synchronous process can be realized relative effectively when the result (status information) of a synchronous process executed in the PE 10 to be transferred via the signal line m can catch the status information transfer operation executed via the signal line (m+1).

When the interval between the transfer via the signal line m and the transfer via the signal line (m+1) is very short, the synchronous process executed via the signal line m may interfere with the synchronous process executed via the signal line (m+1) in the pipeline process executed in each PE 10.

The data transfer and synchronous process can be performed relative effectively by setting the phase difference to the multiple of the (transfer-length/the number of signal lines) being an intermediate value between the two events.

Figure 10:
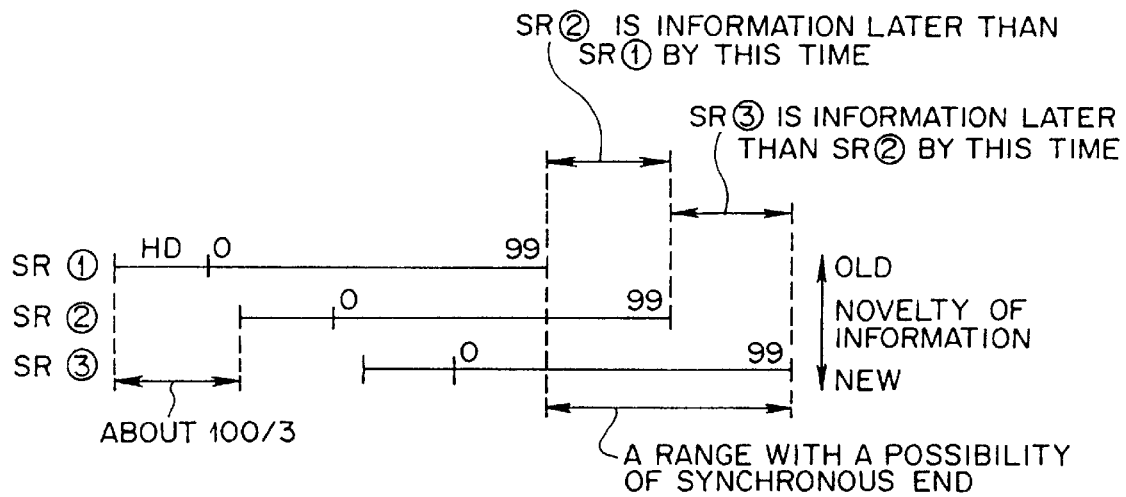

When the parallel processing system according to the present embodiment includes 100 PEs 10 as shown in FIG. 10, the transfer phase difference between the status information SR①, the status information SR② and the status information SR③ is set to about 100/3 (the time taken to transfer the data corresponding to the number of bits of about 100/3) as shown in FIG. 7. The last 100/3 data of the status information SR② is later than the status information SR①. The last 100/3 data of the status information SR③ is later than the status information SR②. That is, the latest status information can be reflected in the synchronous process by transmitting in parallel a plurality of pieces of status information with a predetermined phase difference. Thus, the time at which the synchronous process completes can be reduced so that the synchronous process can be effectively performed.

FIG. 11 shows a timing chart applied when the synchronous process is performed by transferring status information from the mutual connecting unit 20 to each PE 10, using the above-mentioned technique, in the parallel processing system according to the present embodiment shown in FIG. 2. In FIG. 11, numerals ① relates to the process of the status information SR①, numerals ② relates to the process of the status information SR①, and numerals ③ relates to the process of the status information SR③.

In the parallel processing system according to the present embodiment, attention is paid to one of three sets of broadcasting signal lines 30-1, 30-2 and 30-3. The status information received in each PE 10 is divided into some blocks according to the function achieved by the counters 42-1, 42-2 and 42-3 and the transfer-length setting FF 45 in each PE. Then the pipeline process is performed every block unit.

FIG. 12 shows a timing chart in the case where a synchronous process is performed while each PE 10 handles a plurality of pieces of status information SR①, SR② and SR③ divided into three blocks in the parallel processing system shown in FIG. 2. In FIG. 12, numeral ① relates to the process of the status information SR①, numeral ② relates to the process of the status information SR②, and numeral ③ relates to the process of the status information SR③ similarly as shown in FIG. 11.

Such a blocking operation allows the bit number of the status information holding FFs 43-1, 43-2 and 43-3 in each PE 10 to be greatly reduced. Hence, the hardware amount can be reduced. Moreover, as shown in FIG. 12, the operating ratio of the synchronous processing unit 14 is increased and the frequency of reporting synchronous checking results to the CPU 15 is increased. Hence, it is obvious that there is a high probability that the synchronous process will be finished earlier.

The block length can be adjusted by varying the set value of the intra-PE transfer-length setting FF45.

Figure 13A:
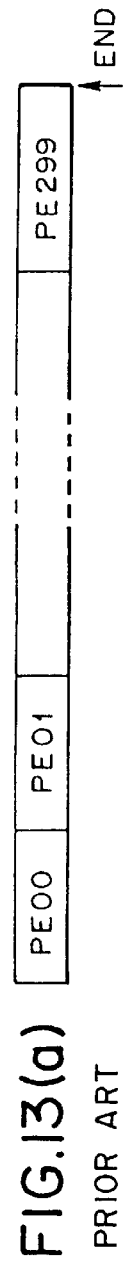
FIG. 13(a) is a diagram used for explaining the transfer length of status information in the prior art and FIG. 13(b) is a diagram used for explaining the transfer length of status information in the preferred exemplary embodiment.
Figure 13B:
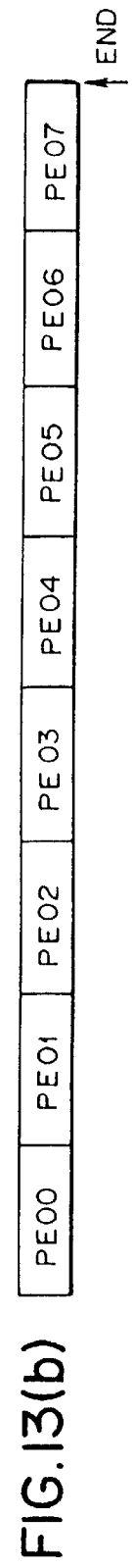

With 300 PEs in the system maximum configuration, as shown in FIG. 13(a), it has been assumed that a plurality of pieces of status information for 300 PEs are certainly transmitted. However, as shown in FIG. 13(b), for example, data can be transferred in one-byte units by setting one byte to the intra-PE transfer-length setting FF 45 (and transfer-length setting FF24).

Such a setting operation does not require inputting in an overlapped mode the status signal regarding each PE 10 to the status register 21 within the mutual connecting unit 20 or subjecting it to a dummy transfer operation. When the mutual connecting unit 20 is formed so as to correspond to the system in which a number of PEs 10 is less than the maximum number of PEs 10 (or a plurality of kinds of mutual connecting units 20 are prepared corresponding to the number of PEs), the bit number of the status register 21 in the mutual connecting unit 20, which is used corresponding to the case where the number of PEs 10 is less than the maximum number, can be reduced significantly.

Figure 14:
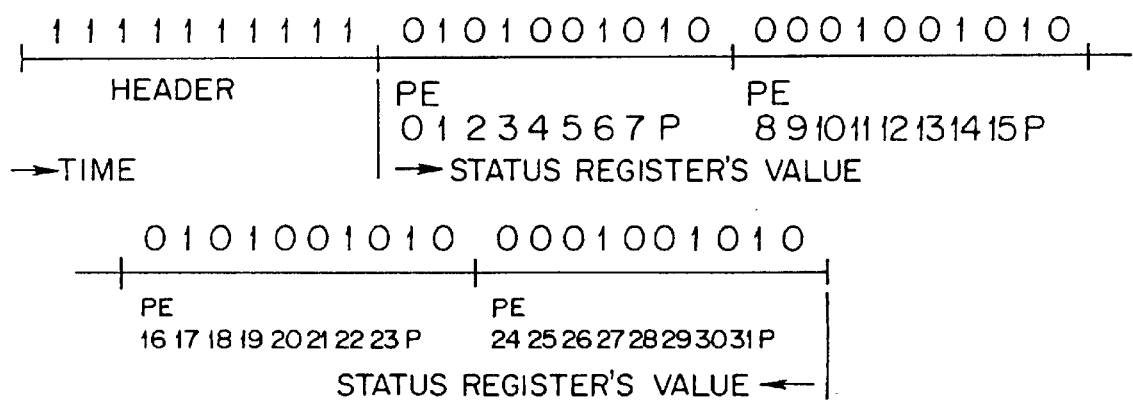
FIG. 14 is a diagram showing an example of the transfer data row of status information according to the preferred exemplary embodiment.

FIG. 14 shows another example of the above-mentioned blocking operation. Let us consider the case where 32 PEs 10, for example, perform a synchronous process. For a brief explanation, it is assumed that the mutual connecting unit 20 transmits the value of the status register 21 using one signal line. 10-bit data including a parity (P) of 1 bit added every one byte and the last bit of "0" is used as one transfer unit. In a data transmission with a single signal line, a data string called a header (HD) being 10 bits formed of continuous "1" is always added to the leading portion of transfer data to show the beginning of the transfer operation of the status register 21. This header is detected by the header detecting circuits 41-1, 41-2 and 41-3. After the detection, each of the counters 42-1 to 42-3 functions to block data.

After each PE 10 receives the header, each of the HLDFF 43-1 to 43-3 starts to set the status information. Originally, the receiving flip-flops corresponding to 32 bits are needed to receive information regarding each of 32 PEs 10. However, in the preferred exemplary embodiment, when the status information for one byte has been received, the configuration starts to transfer it to the next synchronous processing stage. Thus, a capcity of each of the HLDFFs 43-1 to 43-3 will suffice for 9 bits formed of 8-bit data plus 1-bit parity. Moreover, the synchronous processing time can be significantly shortened by adopting the pipeline configuration which transmits data for one byte to the next stage every time it is received.

Figure 15:
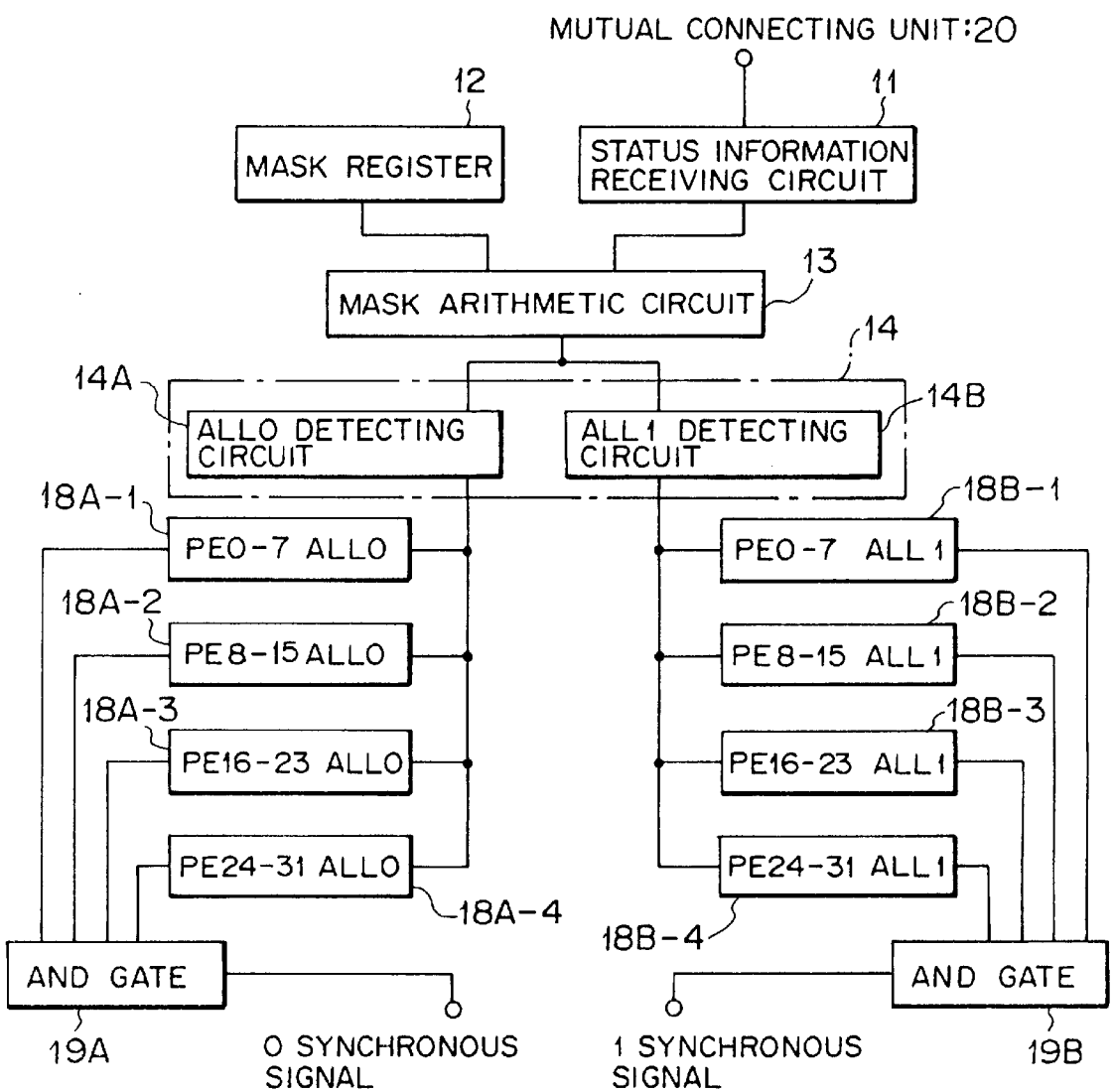
FIG. 15 is a block diagram showing a modified example of the processing element according to the preferred exemplary embodiment.

With the configuration that transmits the status information of one byte to the next stage when it is received, the hardware amount of the remaining portions (such as HLDFF) can be reduced by merely adding a circuit consisting of one-bit registers 18A-1 to 18A-4, 18B-1 to 18B-4, and AND gates 19A and 19B to the next stage of the synchronous processing unit 14, as shown in FIG. 15.

One-bit registers 18A-1 to 18A-4 and an AND gate 19A are arranged on the output side of the ALL0 detecting circuit 14A. One-bit registers 18B-1 to 18B-4 and an AND gate 19B are arranged on the output side of the ALL1 detecting circuit 14B.

When all the status signals of the PE 10 with the PE number 0 to the PE 10 with the PE number 7 become "0" or "1", the one-bit registers 18A-1 and 18B-1 are set to "1". In the same manner, when all the status signals of the PE 10 with the PE number 8 to the PE 10 with the PE number 15 become "0" or "1", the one-bit registers 18A-2 and 18B-2 are set to "1". When all the status signals of the PE 10 with the PE number 16 to the PE 10 with the PE number 23 become "0" or "1", the one-bit registers 18A-3 and 18B-3 are set to "1". When all the status signals of the PE 10 with the PE number 0 to the PE 10 with the PE number 7 become "0" or "1", the one-bit registers 18A-4 and 18B-4 are set to "1".

The AND gate 19A calculates the logical product of the outputs from the one-bit registers 18A-1 to 18A-4 and then outputs the resultant logical product acting as "0" synchronous signal to the CPU 15. The AND gate 19B calculates the logical product of the outputs from the one-bit registers 18B-1 to 18B-4 and then outputs the resultant logical product acting as "1" synchronous signal to the CPU 15.

In the consideration of the parallel processing system having the model configuration that can execute the synchronous process as a pipeline process every 2 bytes and includes 8 PEs 10, the effective range of the value of status information transmitted from the mutual connecting unit 20 is 8 bits (=1 byte). When the synchronous process is fixed in the 2-byte pipeline process mode, the synchronous process completion time is prolonged.

In the instant embodiment, the synchronous process can be executed in a pipeline process mode on 1-byte basis, not 2-byte basis, by merely varying the value of the intra-PE transfer-length setting FF 45 (transfer-length setting FF 24). It is unnecessary to wait for the successive process till 2-byte data is received. Hence, since the successive processes can be simultaneously executed upon receiving 1-byte data, the dummy cycles can be eliminated, whereby high speed processing can be realized.

In the preferred exemplary embodiment, the mask register 12 in each PE 10 stores previously mask information being information regarding the PE 10 to be synchronized. However, in the pipeline operation, it is unnecessary to read out all pieces of mask information, but only mask information regarding the PE 10 in process is partially needed. Hence, the mask register 12 can be formed of a memory element which can read out only a part of information held (or a memory element which can read out partially mask information) such as a RAM or a register file.

Figure 16:
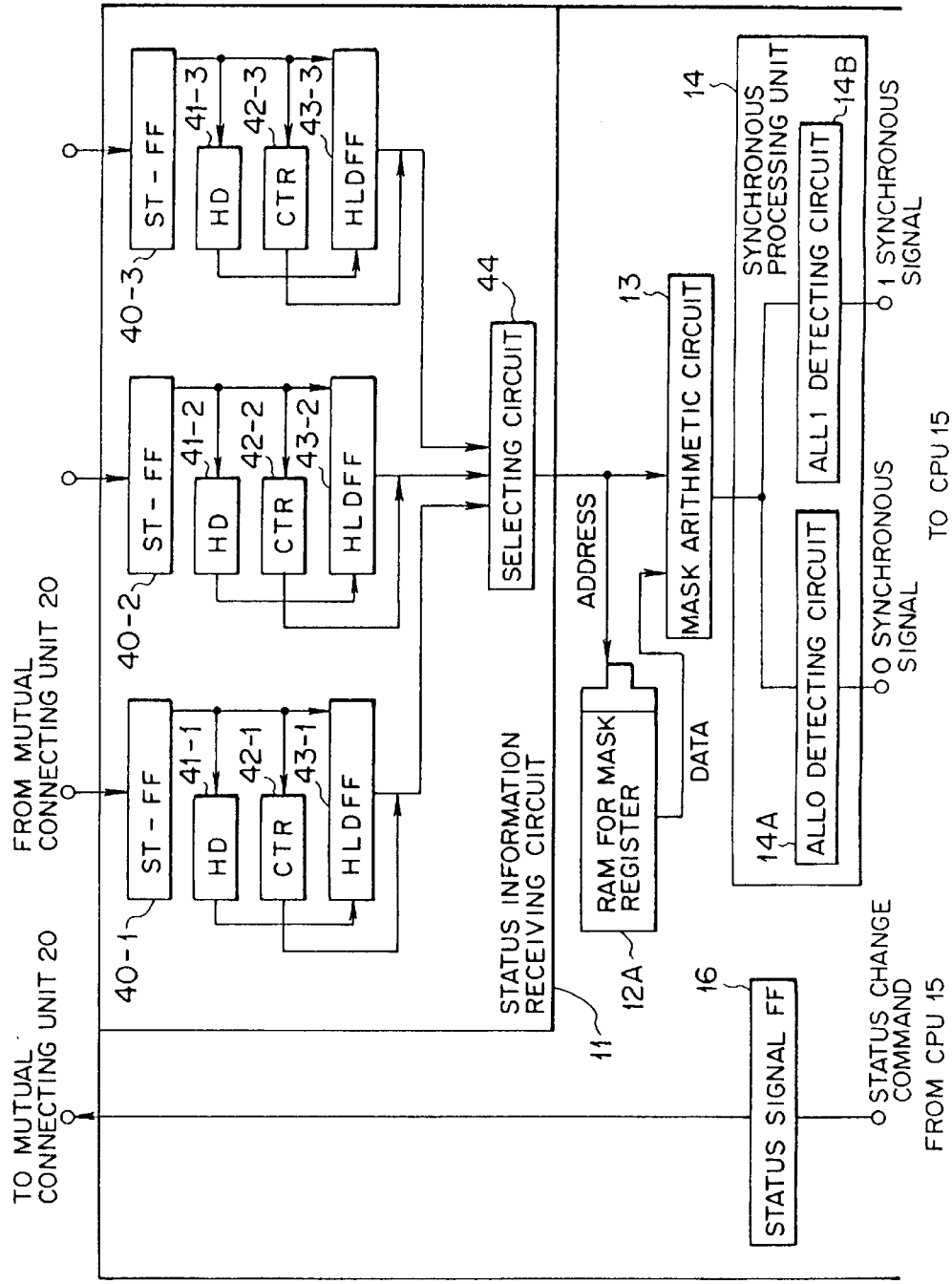
FIG. 16 is a block diagram showing another modified example of the processing element according to the preferred exemplary embodiment.
Figure 18:
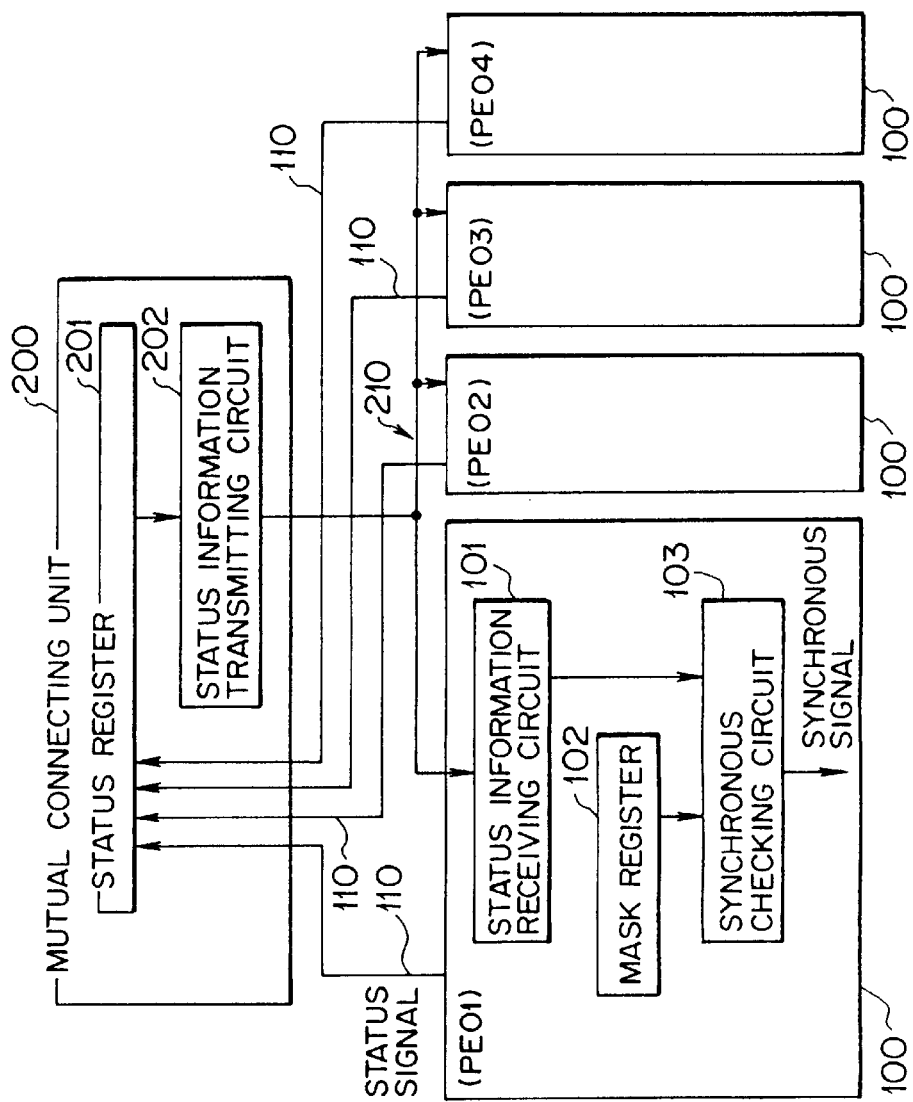
FIG. 18 is a block diagram showing the configuration of a general parallel processing system having a barrier synchronous function.
Figure 19:
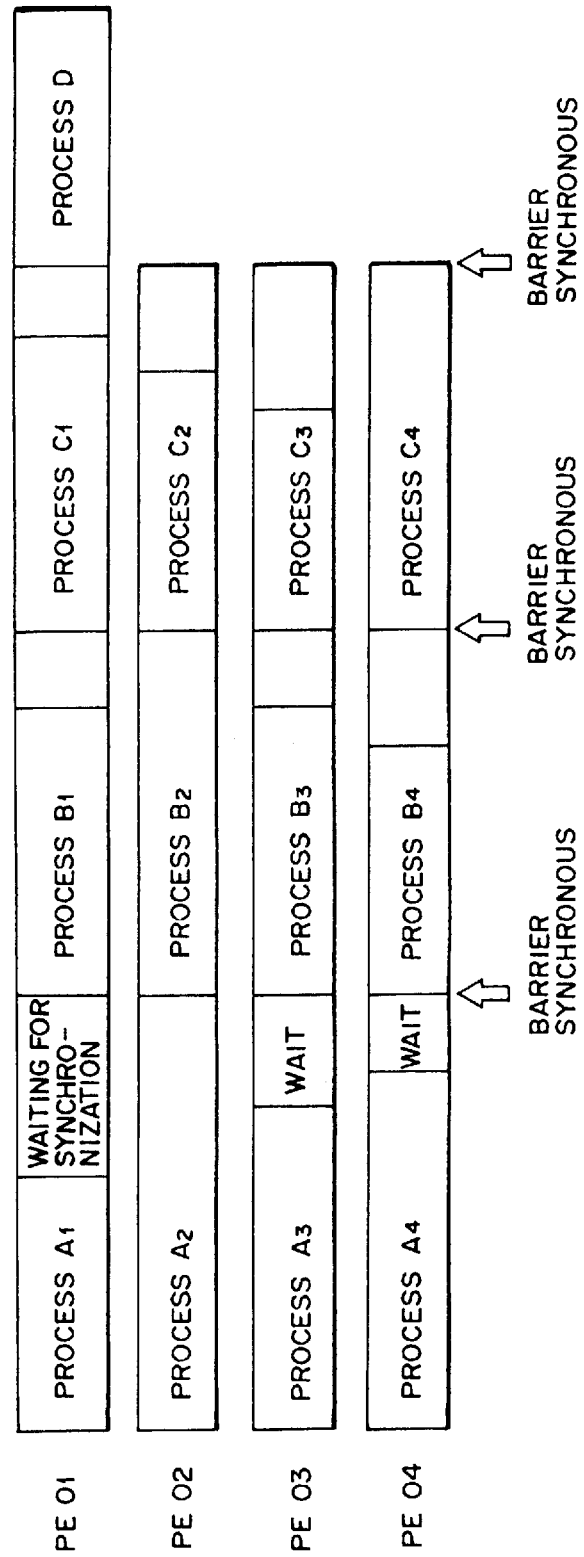
FIG. 19 is a diagram used for explaining a general barrier synchronous process.

FIG. 16 shows an example of a configuration of the parallel processing system including a mask register RAM 12A. The mask register RAM 12A, as shown in FIG. 17, is a RAM which holds 16-bit data for, for example, one entry (or one address). For example, the PE to which "1" is set is to be synchronized and the PE to which "0" is set is not to be synchronized. In the case of the address 0 shown in FIG. 17, the PE with the PE number 1, the PE with the PE number 3, the PE with the PE number 10, the PE with the PE number 11, the PE with the PE number 13, and the PE with the PE number 15 are to be synchronized. The PEs with other numbers are not to be synchronized. A plurality of pieces of mask information regarding PEs with the numbers 16 to 31 are stored to the address 2. A plurality of pieces of mask information regarding PEs with the numbers 32 to 47 are stored to the address 2.

The selecting circuit 44 outputs data including address information designating the mask information regarding the PE to be synchronized (can be recognized as the count value of each of the counters 42-1 to 42-3). The mask register RAM 12A reads out mask information regarding the corresponding PE according to the address information and then outputs it to the mask arithmetic circuit 13. The mask process or the following synchronous process can be performed in the pipeline mode by reading partially mask information in a block unit out of the RAM 12A and then repeating the reading operation every unit time. As described above, the mask register (mask information storage unit) formed of the RAM 12A can deal advantageously with an increase in mask information because of an increase in the number of PEs.

As described above, according to the preferred exemplary embodiment of the present invention, since the status information transmitting circuit 22 transmits in parallel and in a predetermined phase difference the content of the status register 21 to each PE 10 via the three broadcasting signal lines 30-1, 30-2 and 30-3, each PE 10 can execute the synchronous process in the pipelining mode. Moreover, since the synchronous process is executed using the latest status information, it can be executed at a very high speed with a reduced amount of hardware.

Since the various setting functions make it possible to vary various setting conditions in a status information transfer operation, a change in the number of PEs due to a model configuration can be easily handled so that a scalable synchronous process can be realized.

Moreover, in each PE 10, the FFs 40-1 to 40-3, 43-1 to 43-3 are arranged to three broadcasting signal lines 30-1, 30-2 and 30-3, respectively, and the selecting circuit 44 suitably selects the status information regarding each of the FFs 43-1 to 43-3 and then outputs it to the mask arithmetic circuit 13. Hence, even if the number of signal lines inserted between each PE 10 and the mutual connecting unit 20 is increased, countermeasures can be taken by merely adding FFs for the increased signal line. This feature does not cause an increase in hardware amount in each PE 10 and a slow synchronous process.

In the above-mentioned embodiments, explanation has been made as to the case where three signal lines and various sets of PEs 10 are used. However, it should be noted that the present invention is not limited only to these values.

What is claimed is:

1. A parallel processing system, comprising:

a plurality of processing elements;

at least one mutual connecting unit for mutually connecting said plurality of processing elements in a communicable state;

said mutual connecting unit including a status storage unit for storing status information regarding each of said processing elements and a transmitting circuit for transmitting status information regarding each of said processing elements stored in said status storage unit to said plurality of processing elements;

each of said processing elements executing a processing operation according to the status information regarding each of said processing elements transmitted from said mutual connecting unit while being synchronized with the operations of the other processing elements;

a plurality of signal lines arranged between said mutual connecting unit and each of said processing elements, for transmitting the status information regarding each of said processing elements from said mutual connecting unit to said plurality of processing elements; and said transmitting circuit sequentially transmitting the contents in said status storage unit to said plurality of signal lines with predetermined phase difference, and then transmitting said contents in said storage unit in parallel to each of said processing elements.

2. The parallel processing system according to claim 1, further comprising phase difference setting means for setting said predetermined phase difference.

3. The parallel processing system according to claim 2 wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

4. The parallel processing system according to claim 3, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

5. The parallel processing system according to claim 1, further comprising transfer-length setting means for setting the transfer-length of data transmitted from said status storage unit to said plurality of signal lines by means of said transmitting circuit.

6. The parallel processing system according to claim 5, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

7. The parallel processing system according to claim 6, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

8. The parallel processing system according to claim 1, further comprising signal line number setting means for setting the number of signal lines used for data transmission among said plurality of signal lines according to the number of said processing elements.

9. The parallel processing system according to claim 8, further comprising phase difference setting means for setting said predetermined phase difference according to the number of signal lines in use set by said signal line number setting means.

10. The parallel processing system according to claim 9, wherein said phase difference setting means sets the predetermined phase difference to a multiple of [the transfer-length set by said transfer-length setting means/the number of signal lines in use set by said signal line number setting means].

11. The parallel processing system according to claim 10, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

12. The parallel processing system according to claim 11, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

13. The parallel processing system according to claim 8, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

14. The parallel processing system according to claim 13, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

15. The parallel processing system according to claim 9, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

16. The parallel processing system according to claim 15, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

17. The parallel processing system according to claim 1, wherein the status information regarding each of said processing elements transmitted by said transmitting circuit via each signal line is divided into a plurality of blocks, and wherein each of said processing elements executes processing at every block.

18. The parallel processing system according to claim 17, further comprising unit length setting means for setting the split-unit length of each of said blocks.

19. The parallel processing system according to claim 18, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

20. The parallel processing system according to claim 19, wherein said mask information storage unit comprises a storage element which can read partially said mask information; and wherein said mask processing unit executes a mask processing operation by partially reading said mask information corresponding to each block at every block out of said mask information storage unit.

21. The parallel processing system according to claim 20, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

22. The parallel processing system according to claim 19, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

23. The parallel processing system according to claim 17, wherein each of said processing elements comprises:

a mask information storage unit for holding previously as a mask information information regarding the other processing elements to be synchronized with a self processing element; and a mask processing unit for masking the status information regarding the other processing elements not to be synchronized among plural pieces of status information regarding each of said processing elements received via said plural signal lines, based on the mask information held in said mask information storage unit.

24. The parallel processing system according to claim 23, wherein said mask information storage unit comprises a storage element which can read partially said mask information; and wherein said mask processing unit executes a mask processing operation by partially reading said mask information corresponding to each block at every block out of said mask information storage unit.

25. The parallel processing system according to claim 24, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

26. The parallel processing system according to claim 23, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

27. The parallel processing system according to claim 1, wherein each of said processing elements comprises:

a mask information storage unit for holding previously as a mask information information regarding the other processing elements to be synchronized with a self processing element; and a mask processing unit for masking the status information regarding the other processing elements not to be synchronized among a plurality of pieces of status information regarding each of said processing elements received via said plurality of signal lines, based on the mask information held in said mask information storage unit.

28. The parallel processing system according to claim 27, wherein each of said processing elements comprises:

plural receiving storage units for holding temporarily said plural pieces of status information transmitted via said plural signal lines, respectively; and a selecting circuit for selecting suitably one of said plural receiving storage units and then outputting said status information held by selected receiving storage unit to said mask processing unit.

\* \* \* \* \*